Sept. 1, 1959   D. G. C. HARE   2,902,673
SELECTIVE SIGNALLING DEVICE
Original Filed April 10, 1953   2 Sheets-Sheet 1

INVENTOR.
DONALD G. C. HARE
BY W. R. Maltby
Louis B. Applebaum
ATTORNEYS

INVENTOR.
DONALD G.C. HARE
BY W.R. Maltby
Louis B. Appleban
ATTORNEYS

United States Patent Office 2,902,673
Patented Sept. 1, 1959

2,902,673

SELECTIVE SIGNALLING DEVICE

Donald G. C. Hare, Ridgefield, Conn., assignor, by mesne assignments, to the United States of America as represented by the Secretary of the Navy Original application April 10, 1953, Serial No. 348,056. Divided and this application June 8, 1955, Serial No. 514,134

1 Claim. (Cl. 340—171)

This invention relates generally to recording and reproducing systems and more particularly pertains to selective signalling devices adapted to pick up discrete channels from a plurality of channels.

This application is a division of my co-pending application, Serial No. 348,056, filed April 10, 1953, for Training Aid System for Wave Detection Equipment.

In underwater echo ranging or listening a common type of equipment utilized employs a sound head disposed beneath the hull of a ship and made up of forty-eight transducers disposed in a circular ring about a vertical axis. For transmission purposes all of the transducers are pulsed simultaneously to produce an omnidirectional circular sound wave pulse radiating underwater from the sound head. If a portion of this wave pulse happens to encounter in its travel an object of different acoustic impedance than that of water itself, as, for example a submarine, an echo of the pulse wave pulse is created for which echo, when it reaches the sound head, each transducer acts as a separate receptor, converting the acoustic energy of the echo pulse into an electrical sonic signal of corresponding frequency. Sound waves caused by noises of the underwater object may also be detected by a similar conversion.

Each transducer of itself has a slightly directional response pattern which is so broad as to be almost worthless in determining the direction of the object from which the sound originates. As is well known, however, if a number of transducers are grouped together into a regular array to have their electric signals fed to a common junction, and between each transducer and the junction there is introduced an electric signal delay of an appropriate value, a highly directional pattern or lobe for the array can be obtained. Achievement of this highly directional pattern is accomplished by so choosing the time delay values that for a sound wave moving along the perpendicular bisector to the array, the transducer output signals generated thereby reach the junction in phase to produce a composite signal maximum for the array, but for sound waves deviating in line of movement from this bisector, the transducer signals at the junction point cancel in phase to reduce the composite signal from its maximum value, the magnitude of the signal falling off rapidly with deviation.

The type of sonar equipment spoken of incorporates an arrangement for grouping together any selected arc of a fixed number of transducers, for example any six adjacent transducers, into an array to feed, with appropriate delay times, the transducer signals to a common junction joint which is the same for all the arc arrays, the composite signal at the junction representing the directional pattern for the particular arc array selected. Since the forty-eight different arc arrays which may be selected extend around the entire sound head circumference the sound head may be directionally trained 360° in azimuth. In order, however, to maintain high directivity for the sound head and high aural quality for the composite signal at the junction point, it will be seen that it is of vital importance that there be no distortion of the composite signal arising from causes such as a shift in relative phase relation of the selected transducer output signals.

The operation of sonar equipment requires skilled specialists for whom on shipboard more regular training is desirable than that afforded by the occasional opportunities for exercises with a real target. It has been found for shipboard sonar operators that experience with real targets can be very usefully supplemented by recording from the sonar equipment of a master ship a program of sonic signals derived from exercises with a real target and distributing these recorded programs for training purposes to other ships. By playing a record back through the own ship's sonar equipment, a program of sonic signals is generated which simulates as to the own ship the actions of a real target. Naturally the signals derived from a record should duplicate as closely as possible those derived from a real target, particularly in directivity characteristic, in aural quality and in the ability of the signals to respond to a change in train of the sound head by the operator.

In one type of equipment proposed to furnish these recorded training programs, the signal at the output terminal of each of the forty-eight transducers for the sound head of a master ship is recorded on a separate track of a magnetic tape and these recorded signals on forty-eight separate tracks are fed back from a play back tape to corresponding transducer output terminals in an own ship's sonar equipment. This arrangement has the serious disadvantage for the sonar audio section that imperceptible relative longitudinal displacement between the various recorded tracks, from inherent tape yaw or from uneven tape stretch, causes a relative phase relation shift between the various signals sufficiently large to seriously affect the directional characteristic and aural quality for the composite signal produced by the equipment. Further in this previously proposed recording and reproducing equipment, the requirement of forty-eight tracks, one for each of the forty-eight signals would require the use of a magnetic tape so wide as to be excessively expensive and unwieldy. Further the previously proposed equipment has no provision for compensating for a tone change of the reproduced signal with respect to the recorded signal resulting from a variation from standard of the own ship's power generator or from a change in tape dimension caused by wear or weather, for example.

Accordingly, it is an object of the invention to provide an arrangement which will correct the above-noted deficiencies in the proposed devices of the prior art.

It is also an object of the invention to provide an arrangement for recording and reproducing sonic signal programs for sonar training which eliminates the possibility of distortion of program composite signals in the audio section of the sonar equipment.

It is a further object of the invention to provide an arrangement of the above-noted character permitting the use of a tape information storage medium of inexpensive and handy width.

It is a further object of the invention to provide a sonic signal program reproducing system which will simuate accurately the characteristically smooth signal transition from one position of train to another of sonar equipment when receiving sound from real targets.

It is a further object of the invention to provide a switching arrangement between a sonic signal program reproducing device and a sonar equipment so that selectively both audio and video sections of the sonar may be used for training purposes or one of these sections may be left in normal operating condition to provide a guard watch for real targets which may be encountered.

These and other objects of the invention are attained by providing a sonic signal program recording unit which in the course of exercises of a master ship with a real target receives forty-eight signals of supersonic frequency from the output terminals of the forty-eight transducers in the master ship sound head. These forty-eight signals in the recorder unit are associated together in forty-eight different groups corresponding to the forty-eight arc arrays of transducers which can be formed for the master ship sound head. For each of these mentioned groups the different signals in a given group are fed to a group junction point, the separate signals being respectively delayed in time in the same manner, as described as they would be delayed by the master ship sonar equipment itself. Forty-eight composite signals are thus produced at a corresponding number of group junctions, each composite signal representing the response of the master sound head to sound waves when trained to switch in a corresponding transducer arc array.

From the group junctions mentioned, the composite signals are first converted from supersonic frequency to the audio frequency normally heard by the sonar operator and are then associated together in the recorder unit in equal size groups of say, six signals. The composite signals in each group of six are impressed in regular order as modulations on carrier waves with spaced apart frequencies. Each group of six modulated carrier waves so resulting is recorded on a single track on an information storage medium such as a magnetic tape, the six carrier frequencies for each group so recorded being the same. Hence, in order to record the forty-eight composite signals only eight tape tracks are necessary permitting the use of a tape of inexpensive and handy width.

In addition to the mentioned eight tracks, a ninth track is also utilized recording, among other signals, a fixed frequency reference signal providing a correction standard, for playback, of the frequency of the recorded sonic signals.

From the master tape the sonic signal program is transferred in a conventional manner to playback tapes, which are distributed for training purposes to various ships having sonar equipment. A playback tape of this sort is run through a playback unit associated with an own ship's sonar equipment to generate the forty-eight composite signals in the form of six modulated carriers at each of eight pickups, and also, at a ninth pickup, the fixed frequency reference signal. A circular switch in the playback unit is adapted to select any six composite signals in six adjacent carrier channels, this circular switch being mechanically coupled to the sound head training mechanism manually so that a principal channel of the six selected contains the composite signal corresponding in directivity characteristic to the indicated train in azimuth of the own ship's sound head. The composite signals of this principal channel and its five collateral channels are demodulated and then impressed at correspondingly ordered points upon a circular potentiometer having a movable tap. This movable tap is also mechanically coupled to the sound head training mechanism in such manner that as the operator turns the train knob the various principal channels are successively cut in or out with respect to the movable tap. Thus, the playback unit simulates, between positions of train, the smooth signal transition characteristic of the sonar equipment for sound waves received from an actual target.

The output signal at the mentioned movable tap is converted back to supersonic frequency by a mixer stage which is automatically controlled by the reference signal reproduced from the ninth track of the playback unit to correct any variance of the composite signal frequencies between recording and reproduction.

The mixer stage output signal is then introduced into the own ship's sonar equipment at a point in the audio section following the common junction described. Thus, it will be seen that as the playback unit is run the sonar equipment operator will receive a program of sonic signals which simulate very accurately echoes or other noise received in fact by the sonar equipment.

The playback unit is adapted to be coupled to the own ship's sonar through a master switch and separate audio and video switches which can be independently thrown to "train" or "operate." If the master switch is thrown to "train" either the audio or video section will still continue in normal operation until its respective switch is thrown to "train." Thus one of the sections may be used as a guard watch while the other is used for training purposes.

The invention may be better understood from the following detailed description of a typical form thereof taken in conjunction with the accompanying drawings in which.

*The sonar equipment*

Figures 1, 3:
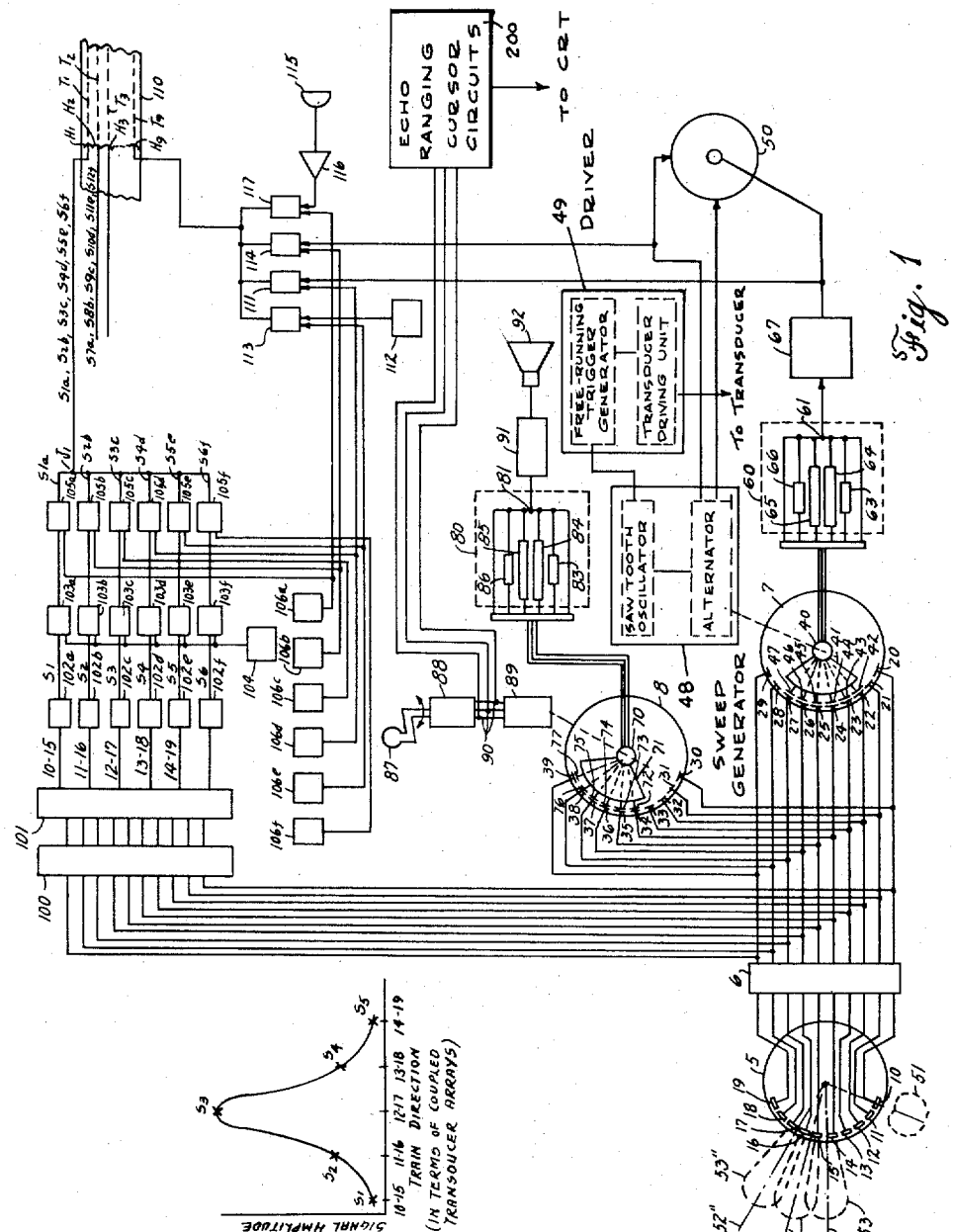
Fig. 1 illustrates schematically a sonar equipment for a master ship together with a recording device for recording sonic signal programs from the master ship sonar.
Fig. 3 is a graphical representation of a typical effective directional response pattern for a sonar equipment.

Referring now to Fig. 1, the figure discloses, as a component of the sonar equipment of a master ship, a sound head 5 adapted to be disposed in mechanically stationary relation beneath the ship's hull. The sound head contains within its interior, in a circular ring arrangement about a vertical axis, forty-eight evenly spaced transducers which are acoustically coupled through the sound head wall with the surrounding water. Each of the forty-eight transducers is electrically connected through a preamplifier stage (not shown) in a preamplifier unit 6 to an inward facing video transducer segment in a video scanning switch 7. The forty-eight video transducer segments are evenly spaced in a circular ring arrangement in a manner duplicating the positioning of the corresponding transducers, the mentioned segments being insulated from their supporting frame (not shown) and from each other in a conventional manner. Additionally, each of the forty-eight transducers, through the preamplifier unit 6, is connected to an audio transducer segment in an audio scanning switch 8 mutually arranged in a manner similar to that described for the video scanning switch. For convenience only ten transducers 10–19, inclusive, with their corresponding ten video transducer segments 20–29, inclusive, and ten audio transducer segments 30–39, inclusive, are shown in Fig. 1, the angular spacing between these elements in their circular rings being exaggerated.

Considering now the video switch 7, a shaft 40 aligned with the axis of the video transducer segment ring carries in fixed relation a sector member 41 rotatable in the ring plane. This sector member has mounted upon its peripheral arc in conventionally insulated relation from the sector member, six sector segments 42–47, inclusive, which are adapted upon appropriate positioning of the shaft to register respectively and in slightly spaced relation with any six adjacent video transducer segments. The sector segments of the video switch 7 are respectively connected by leads to a set of six collection rings (not shown) on the shaft 40 which are in turn adapted to be respectively engaged in electrically conducting relation by six stationary brushes (not shown).

The shaft 40 of video scanning switch 7 is mechanically coupled to a sweep generator unit 48 for rotation at a fixed speed by a component thereof as, for example, an electro mechanical alternator operating from the master ship's power frequency. The sweep generator unit 48 also comprises a sawtooth oscillator the output of which is fed to the field of the alternator. The output of the alternator is thus a sine wave having a sawtooth modulation envelope. The frequency of the sawtooth wave is determined by the frequency of the free-running trigger circuit which is a component of the driver 49, and the sine wave frequency is determined by the speed of the alternator. The trigger pulses are fed to the sawtooth oscillator and to the transducer driving unit which causes all the transducers to be pulsed simultaneously through connections (not shown). The transducers when so pulsed convert the mentioned electric signals into acoustic energy which radiates outwards from the sound head as an omnidirectional sound wave of circular form.

The sweep generator unit 48 further contains component circuits (not shown) for producing three-phase sweep signals which are respectively applied by leads to the three-phase deflection coils (not shown) of a cathode ray tube 50 having a long persistence screen. The mentioned sweep signals cooperate to cause the cathode ray tube beam to rotate in synchronism with the video scanning switch rotation, and to further cause the cathode ray tube beam, starting with each sound wave transmission, to travel from the screen center outwards in a linear manner towards the screen periphery. There is thus produced a helical scan for the cathode ray tube 50. Of course, a cathode ray tube having conventional quadrature horizontal and vertical deflection means may be employed, in which case the sweep generator unit 48 is designed to furnish a horizontal and a vertical sweep signal rather than a three-phase sweep signal.

Returning now to a consideration of the relation between the transducers of the sound head 5 and the video scanning switch 7, assuming for convenience of description a full registry of six sector segments 42–47, inclusive, with any specified six adjacent video transducer segments, the pairs of registering segments thus formed act as capacitors permitting transducer output signals to be coupled to the stationary brushes previously mentioned. Thus, it will be seen that the video scanning switch 7 acts as a grouping device to associate any six adjacent transducers into an array.

Consider now that transducers 12–17 inclusive, are coupled into such an array by the video scanning switch, for any one independently acting transducer the directional pattern of response to an approaching sound wave (of linear wave front) takes the form of a broad cardioid 51 as shown for transducer 10. Obviously, this broad cardioid pattern for a singly acting transducer is of little value in determining the direction from which the sound wave originates. If, however, a number of adjacent transducers, as for example transducers 12–17, inclusive, could be grouped into a spatially linear array, a linear wave front approaching the array along the perpendicular bisector 52 to the same would impinge upon all of the transducers 12–17, inclusive, simultaneously. Thus, the group of transducers 12–17, inclusive, would convert the acoustic energy received into electrical signals having the same standard phase, which signals, if fed with no time delay or equal time delay to a common junction point, would form composite signals of maximum signal strength. With respect to this hypothetical linear array, if the wave front deviates in line of movement from the mentioned bisector 52 various ones of the transducer output signals would lead and lag in phase respectively the mentioned standard phase in a mutual phase cancellation relation causing a reduction of the composite signal from its maximum strength by a factor which increases rapidly with increase of the mentioned deviation.

In the sound head shown the response of an actual transducer array, for example transducers 12–17, inclusive, differs from that of a hypothetical linear array, since the actual group of transducers presents to an approaching wave front a convex arc configuration. Thus, for a linear wave front approaching the array along the perpendicular bisector 52, the two centrally disposed transducers 14 and 15 will be impinged upon by the wave front earlier than the outwardly disposed transducers 12 and 17, inasmuch as the wave front travels an extra distance through the water to the outer transducers 12 and 17. This variance in configuration between the actually used convex arc array and the hypothetically desirable linear array can, however, be compensated for electrically in the manner described as follows.

From the mentioned six stationary brushes each of the six signals derived from six adjacent transducers through the video scanning switch 7 is fed to a separate one of six inputs in a video lag line assembly 60. Concerning this assembly, the signals derived from the two outer transducers pass through the same with no delay to a common junction 61. The signals derived from the two center transducers pass to the common junction 61 through two separate lag lines 64 and 65, which may be composed of lumped inductances and capacitances, for example, and which are adapted to furnish a signal delay time which equals the time required for a frontally approaching wave to reach the outer transducers 12 and 17 after striking the central transducers 14 and 15. The signals derived from the other two or median transducers 13 and 16 in the array pass respectively through another two lag lines 63 and 66 to the common junction point 61. These median lag lines 63 and 66 furnish delay times of shorter value than those of the central lag lines 64 and 65 as represented by the relative lengths of the same as shown in Fig. 1, the delay time for the median lag lines 63 and 66 being equal to the interval required for a frontally approaching wave to reach the outer transducers 12 and 17 after it has struck the median transducers 13 and 16.

Thus at the common junction 61 of the lag line assembly 60 it will be seen that the same effect is produced by the transducer output signals as if all of the transducers involved were disposed in spatially linear array. Accordingly, for each arc array of transducers selected by the video scanning switch 7 the composite signal at the output of the video lag line assembly 60 will represent a sharply directional response pattern or lobe for the arc array, symmetrical about the perpendicular bisector to the same. In Fig. 1 there is shown three such lobes 53, 53' and 53" symmetrical about the bisectors 52, 52' and 52", respectively, and representing the directional response pattern for the transducer arrays 12–17, inclusive, 13–18, inclusive, and 14–19, inclusive.

As the sector member 41 of the video switch 7 continuously rotates the six sector segments 42–47, inclusive, will make in turn forty-eight full registries with forty-eight different transducer arc arrays to produce a continuous composite signal at the output of the video lag line assembly 60 which represents in turn the separate directional patterns of the mentioned forty-eight arrays. Since between positions of full registry such sector segment will be coupled in part with one video transducer segment and in part with another, a smooth transition as the composite output signal will be obtained from one directional pattern to the next.

From the output of the video lag line assembly 60 the composite signal is fed to the input of a video receiver 67 where it is demodulated and amplified. The signal at the output of the video receiver 67 is fed to a beam intensity modulating electrode (not shown) of the cathode ray tube 50 to cause beam indications upon the cathode ray tube screen in the presence of underwater sound detected by the sound head. Since the beam is swept as stated in a helical scan, and since further the speed of beam movement outward from the center is correlated with the underwater speed of sound, the cathode ray tube will accordingly present the range and bearing of an underwater object detected by echo ranging, or the bearing of other type sounds detected.

As mentioned, each of the transducer output signals is fed to a separate audio transducer segment arranged in a circular ring in an audio scanning switch 8. The audio section substantially duplicates in arrangement the video section with respect to the shaft 70, sector member 71 and sector segments 72–77, inclusive, of the audio scanning switch, the collection ring (not shown) and brush arrangement (not shown) for bringing signals out of the audio scanning switch 7, and the audio lag line assembly 80 through which the six signals of the transducer array selected by the audio scanning switch 7 are fed to form a composite signal at the output 81 of the lag line assembly 80. The audio section differs from the video section in that the angular position of the sector member 71 is manually determined by the soundman by means of a conventional follow-up system, shown in Fig. 1 as a sonar train knob 87 positioned by the soundman, a transmitter synchro 88 mechanically coupled to the sonar train knob 87 and a receiver synchro 89 mechanically coupled to the shaft 70 of the audio scanning switch, the transmitter and receiver synchros being electrically coupled by the conventional three wire connection 90. The directional train of the sound head may be indicated to the soundman by a bearing cursor. Hence, in contrast to the video section which continuously scans through 360° of train the audio section is adapted to examine one train direction for the sound head 5 at a time for more extensive evaluation of sonic signals which may be received from this direction.

From the output of the audio lag line assembly 80 the composite signal is fed to the input of an audio receiver 91 where it is amplified and frequency converted from a supersonic frequency to a standard audio frequency of 800 c.p.s. From the output of the audio receiver 91 the signal produced is fed to a loudspeaker 92 where it may be heard by the soundmen.

In the type of sonar equipment just described separate audio and video sections are used which are operable independently of each other, for the reason that the audio signal furnishes a great deal of information concerning the origin of sound received which is not obtainable by observation of the video signal on the cathode ray tube screen. For example, from the tonal quality of the audio signal it is possible to discriminate between different types of objects returning echoes, as for example, between submarines and whales. Also, with the audio signal, Doppler effect is observable which indicates the relative movement of an object detected by echo ranging with respect to the detecting sound head. Also by taking frequent "cuts" in train from one side to another of a detected object, the soundman can determine facts about the bearing and relative angular movement of the detected object which are not as clearly indicated by video section. It will be recognized that in order for this highly useful information to be available from the audio signal that it is of vital importance that there be no distortion of the composite signal, caused, for example, by a shift in relative phase relation of the transducer output signals in a selected array as these signals pass through the sonar system.

A sonic signal program recorder unit which permits playback of the recorded program through similar sonar equipment while avoiding this mentioned undesirable shift in phase relation will now be described.

The recorder unit

From the various transducers of the sound head 5 the output signal from each transducer is fed through one or more, as required, preamplifier stages (not shown) in a preamplifier array 100 to a separate terminal (not shown) in a junction box 101. From its junction box terminal, each of the signals is distributed in a six way distribution to six recorder lag line assemblies 102 of which there are forty-eight in all. The mentoned recorder lag line assemblies 102 are of the six input type, substantially duplicating the video lag line assembly 60, and hence need not be herein described in detail. For convenience only six of the recorder lag line assemblies, 102a, 102b, 102c, 102d, 102e, 102f, are shown.

As the mode of distribution of the transducer output signals, various ones of the same are fed separately from the terminals of the junction box 101 to the six inputs for each recorder lag line assembly 102 so that there is presented to each lag line assembly a group of six signals, each group corresponding to a different transducer arc array selectable by the audio scanning switch. For example, the output signals from transducers 12–17, inclusive, are fed from top to bottom in the order named to the six inputs of lag line assembly 102c; the output signals of transducers 13–18, inclusive, are fed from top to bottom in the order named to the six inputs of lag line assembly 102d; the output signals of transducers 14–19, inclusive, are fed from top to bottom in the order named to the six inputs of lag line assembly 102e, and so forth. Thus, at the output of each recorder lag line assembly 102 there is formed a composite signal representing a directional pattern of response or lobe 53 for a corresponding transducer arc array, the forty-eight composite signals consecutively corresponding in order to that of the forty-eight lobes 53 taken consecutively around the sound head. For each of these composite signals the high aural quality characteristics of the output signal of the audio lag line assembly 80 is fully preserved.

For convenience, each of the composite audio signals so formed may be designated by the letter, $s$, followed by the number of its corresponding array, considering that the array of transducers 10–15, inclusive, is the first array. Thus $s_1$ is the composite audio signal for the arc array of transducers 10–15, inclusive, $s_2$ is the composite audio signal for the arc array of transducers 11–16, inclusive, and so forth.

From the output of the forty-eight recorder lag line assemblies 102 the forty-eight composite signals are impressed respectively upon the input of forty-eight mixer stages, of which for convenience only six stages, 103a, 103b, 103c, 103d, 103e, and 103f, are shown. The forty-eight mixer stages 103 also receive as inputs a signal common to all, derived from a beat frequency oscillator 104. Each of the forty-eight mixer stages 103 converts in frequency the composite signal received thereby from a supersonic frequency to an audio frequency centering about a standard value of 800 c.p.s.

From the mixer stages 103 the forty-eight composite signals are associated together in a regular order as taken from top to bottom in eight groups of six signals. For each group of six, the member signals are impressed respectively upon the inputs of a group of six out of forty-eight separate modulator stages 105. For convenience only one such group of six stages, 105a, 105b, 105c, 105d, 105e, and 105f, is shown. In each of the mentioned groups, each of the six modulator tubes 105, in corresponding order for all the groups, receives as an additional input a carrier wave from a different one of six modulating oscillators, 106a, 106b, 106c, 106d, 106e, and 106f, tuned to frequencies of $f_a$, $f_b$, $f_c$, $f_d$, $f_e$, and $f_f$, respectively. The frequencies of the output signals of each of the six modulating oscillators 106 are staggered a sufficient amount with respect to those of the others so that upon subsequent combination of the modulator stage output signals in each group of six, no cross modulation will result. Thus at the outputs of the modulator stages 105 the forty-eight composite audio signals will appear respectively as modulations upon forty-eight carrier channels, the carrier frequencies of the channels being cyclically repetitive every six signals. The signals at the modulator stages may be given the convenient notation $s_{1a}$, $s_{2b}$, $s_{3c}$, $s_{4d}$, $s_{5e}$, $s_{6f}$, $s_{7a}$, $s_{8b}$, and so forth.

For each group of channels the composite audio signals are fed from the outputs of their respective modulator stages 105 to a common channel junction point J, one for each group, to combine there as a multiplex or multiple channel signal. For convenience only one such junction point J₁ is shown. Each of the multiplex signals so formed is fed to a separate audio signal scribing head H, as for example a magnetic scriber, which is aligned to register with a separate audio track T on a moving information storage medium, as for example a length of magnetic tape 110, there being eight audio scribing units and eight audio tracks in all. For convenience only three audio scribing heads $H_1$, $H_2$ and $H_3$ registering with respective tracks $T_1$, $T_2$ and $T_3$ are shown. Since the sonic signal program recorder unit described uses only eight audio tracks T for recording of the forty-eight separate audio channels, the recorder unit permits the use of magnetic tape of an inexpensive and handy half inch to an inch width as compared to the four inch width necessary if the forty-eight audio channels were each recorded on a separate track. Also, since no more than six different carrier frequencies are multiplexed together for recording on a single track T, the required band width characteristic of the recording system may be kept within reasonable limits.

In addition to the eight audio tracks mentioned, a ninth track $T_9$ is used on the information storage medium of the presently described recording unit to provide channels for various other useful signals in a manner now to be described. In contrast to the audio portion of the recorded sonic signal program which must provide the feature that the recorded signals will respond in the same manner as would signals from a real target to positioning in train of the sonar equipment by the soundman, no similar requirement exists with respect to the video portion of the sonic signal program since the video section of the sonar equipment is continuously scanning through 360° of train. Hence, as to the video section, instead of recording forty-eight separate signals it is necessary to record only the composite video signal which is normally fed to the intensity modulating electrode (not shown) of the cathode ray tube 50. This recording is accomplished by impressing the output of the video receiver 67 upon an input of a modulating stage which also receives a carrier wave input of frequency $f_d$ from the modulating oscillator $106_d$. The composite video signal appearing as modulation upon the carrier wave at the output of the modulating stage 111 is then fed to a magnetic scriber head $H_9$ registering with the ninth track $T_9$ to be recorded thereon.

It often happens that between the recording of a sonic signal program by a master ship and its subsequent playback upon another ship there is a shift in pitch of the audio-frequency signals resulting from a non-standard tape speed caused, for example, by difference in power frequency between the master ship and other ship or from a change in dimension of the recording tape under the influence of temperature and humidity conditions or wear. In order to nullify this otherwise occurring frequency shift, the output signal from a 800 c.p.s. fixed reference frequency oscillator 112 is impressed as an input upon a modulator stage 113 which also receives another input the signal of frequency $f_e$ from the modulation oscillator $106_e$. This reference frequency signal at 800 c.p.s. appearing as modulation on the carrier wave at the output of the modulator 113 is also fed to the magnetic scriber head $H_9$ for recording on the ninth track $T_9$ on the magnetic tape 110.

When the sonic signal program is reproduced, it is necessary that the helical scan for the cathode ray tube 50 be synchronized to have the same relation to the reproduced sonic signals as originally existed upon recording. Synchronization of the cathode ray tube scan is accomplished by impressing, for use as a synchronizing signal, one of the two electrical sweep waves from the output of the sweep generator unit 48 upon the input of a modulating stage 114. This modulating stage 114 also receives as another input a signal frequency $f_b$ from the modulating oscillator $106_b$. The synchronizing sweep wave, appearing as modulation upon a carrier wave at the output of the modulator stage 114 is also recorded by the magnetic scriber head $H_9$ upon the ninth track $T_9$ of the magnetic tape 110.

It has often been found desirable to accompany a sonic signal program with a voice commentary. Voice commentary recording is accomplished by having the commentary picked up by a conventional microphone 115 with the resulting signals from the microphone being passed through a conventional amplifier section 116 to be impressed upon an input of a modulating stage 117. The modulating stage 117 receives as another input a signal of frequency $f_a$ from the modulating oscillator $106_a$. The voice commentary appearing as modulation on a carrier wave at the output of the modulating stage 117 is recorded by the magnetic scriber head $H_9$ upon the ninth track $T_9$ of the magnetic tape 110.

It will be recognized (as in the case of the recorded composite audio signals, associated together in groups of six to form a multiplex signal for recording on a single track), that the composite video signal, the 800 c.p.s. reference signal, the synchronizing sweep wave and the voice commentary combine together to form a four channel multiplex signal which is in fact the signal impressed on the ninth track $T_9$ of the magnetic tape 110.

*The playback unit*

Figure 2:
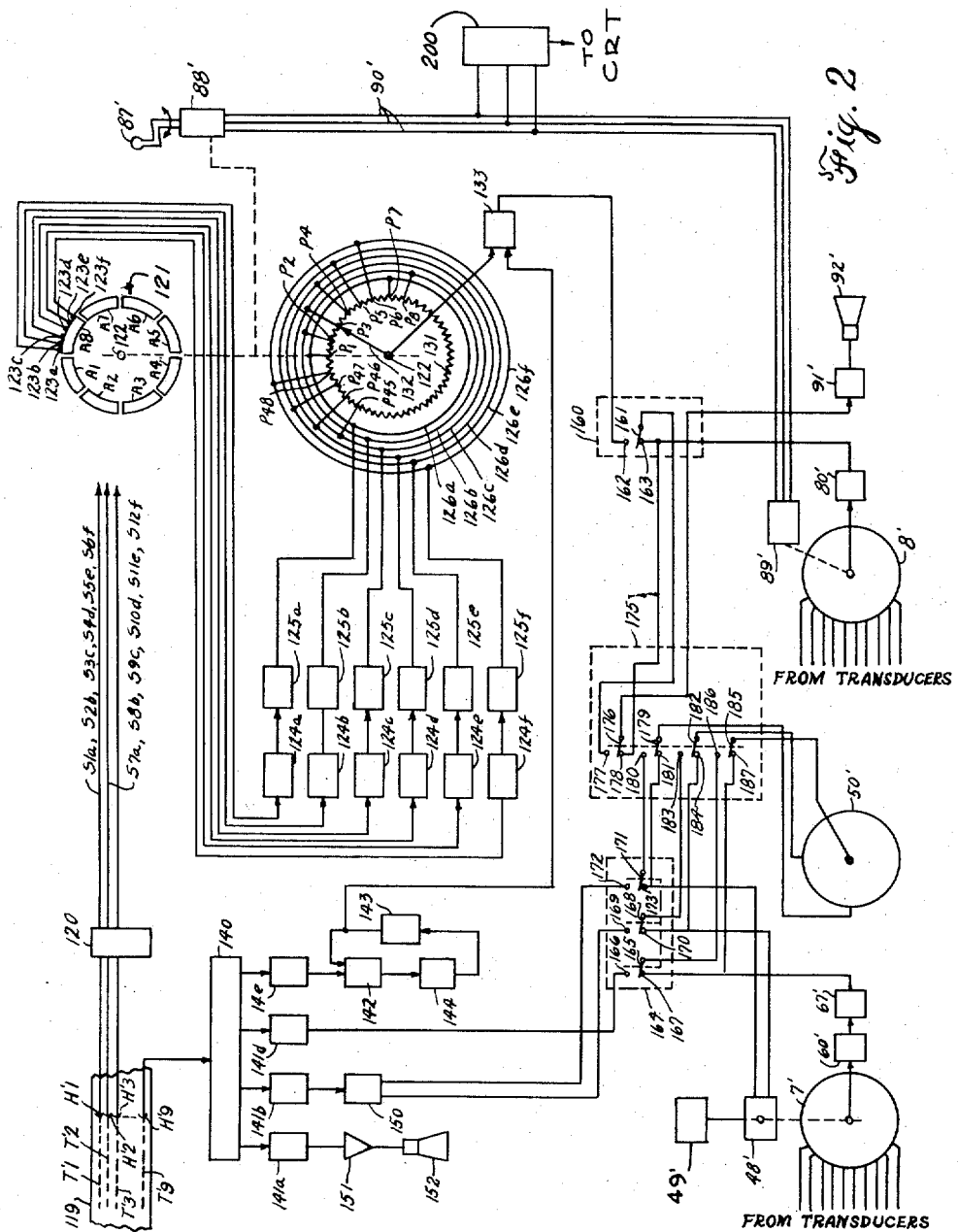
Fig. 2 illustrates schematically an own ship's sonar equipment together with a playback device for reproducing recorded sonic signal programs through the own ship's sonar.

From the nine track master tape produced in the manner just described, the sonic signal program may be transferred in a conventional manner to similar playback tapes which may be distributed to other sonar equipped ships with playback units for training purposes. In Fig. 2 there is disclosed an exemplary one of such playback units together with an associated own ship's sonar. Since, as to the sonar equipment itself the arrangement of Fig. 2 is substantially a duplicate of that in Fig. 1, a detailed discussion of the Fig. 2 sonar equipment is not necessary. Each component of the own ship's sonar is designated by the same number as the corresponding component of the master sonar, but with the number primed.

Considering now the playback unit shown in Fig. 2, a nine track playback tape 119 is adapted to be moved past nine signal pickup heads $H_1'$–$H_9'$, inclusive, registering respectively with the various tracks $T_1'$–$T_9'$, inclusive. As in the case of the master tape, eight playback tape tracks are devoted to forty-eight composite audio signals distributed in a cyclically repetitive order as to carrier frequency in eight groups of six signals. For convenience only three audio pickup heads $H_1'$, $H_2'$, and $H_3'$ registering respectively with three audio tracks $T_1'$, $T_2'$ and $T_3'$, are shown. The ninth track $T_9'$ of the playback tape 119 is devoted to the composite video, reference frequency, synchronizing sweep wave, and voice commentary signals.

With reference to the destination of the forty-eight composite audio signals, the eight audio pickups H' generate eight separate multiplex signals which are fed respectively through separate stages (not shown) in a preamplifier unit 120 to eight switching segments $A_1$–$A_8$, inclusive, disposed in a circular ring arrangement upon the first deck of an audio direction control switch 121. These eight segments A which are conventionally insulated from each other and the switch frame (not shown) are mounted by conventional means (not shown) to rotate with the rotation of a central, audio direction control switch shaft 122 aligned perpendicular to the plane of the switching segment ring. The outer peripheral arc of each of the eight segments is adapted, upon appropriate angular positioning by rotation of the mentioned shaft 122, to conductably engage one or more of six ball contacts 123a, 123b, 123c, 123d, 123e, and 123f, spaced apart in an arc of a width the same as the width of a segment A. These six ball contacts 123 are consecutively connected by separate leads to the inputs of six separate conventional band pass filter units 124a, 124b, 124c, 124d, 124e, and 124f, which are tuned consecutively to pass respectively the carrier frequencies $f_a$, $f_b$, $f_c$, $f_d$, $f_e$, and $f_f$ of modulating oscillators $106a$–$106f$, inclusive. The outputs of the six filter circuits $124a$–$124f$, inclusive, are connected to the respective inputs of six demodulating stages $125a$, $125b$, $125c$, $125d$, $125e$, and $125f$, which demodulate those signals received from their respective filter units to produce composite audio signal of frequencies centering about the standard value of 800 c.p.s.

The arrangement just described is adapted to produce at the outputs of the six demodulating stages $125a$–$125f$, inclusive, the output signals of any six adjacent audio channels in the following manner. Considering switching segment $A_1$, assume that this segment is moved clockwise in Fig. 2 to only engage contact $123a$. That portion of the multiplex signal on segment $A_1$ representing channel $s_{1a}$ will reach demodulating stage $125a$ by passage through filter unit $124a$ while the other five channels are blocked by the filter unit. Assume now that segment $A_1$ is moved to engage only contacts $123a$ and $123b$. Demodulating stage $125a$ will receive channel $s_{1a}$ as before, while demodulating tube $125b$ receives only channel $s_{2b}$ for the reasons just set forth with respect to demodulator stage $125a$. Ultimately segment $A_1$ may be moved to engage all six contacts $123$ when it will be seen that each of the six channels $s_{1a}$, $s_{2b}$, $s_{3c}$, $s_{4d}$, $s_{5e}$, $s_{6f}$ on segment $A_1$ will be routed to the appropriate one of the six demodulating stages $125$. The audio direction control switch shaft $122$ may now be rotated further in the same direction so that segment $A_1$ engages contacts $123b$–$123f$, inclusive, but contact $123a$ is engaged by segment $A_2$. In such case, channels $s_{2b}$, $s_{3c}$, $s_{4d}$, $s_{5e}$, and $s_{6f}$ will still be routed respectively to demodulation stages $125b$–$125f$, inclusive, but demodulator stage $125a$ will receive and only receive $s_{7a}$ the other channels $s_{8b}$, $s_{9c}$, $s_{10d}$, $s_{11e}$, and $s_{12f}$, conveyed by segment $A_2$ being blocked by the filter unit $124a$ preceding demodulator stage $125a$. Analogously, with a further rotation of the mentioned switch to cause engagement of contacts $123a$ and $123b$ with segment $A_2$ and contacts $123c$, $123d$, $123e$, and $123f$ with segment $A_1$, audio channels $s_{7a}$, $s_{8b}$, $s_{3c}$, $s_{4d}$, $s_{5e}$, and $s_{6f}$ will be routed to modulator stages $125a$–$125f$, inclusive, respectively. A similar line of reasoning applies as all of the switching segments A in turn are electrically coupled with one or more of the six ball contacts $123$.

It will thus be seen that by means of appropriate rotation of the eight switching segments A any six adjacent channels, for example $s_{7a}$, $s_{8b}$, $s_{3c}$, $s_{4d}$, $s_{5e}$, and $s_{6f}$, can be coupled to the six demodulator stages to produce at the outputs thereof six audio frequency, composite audio signals, for example $s_7$, $s_8$, $s_3$, $s_4$, $s_5$, and $s_6$. It will also be noted that these six signals do not always appear in consecutive order, as desired, at the outputs of the mentioned stages, a matter corrected by means now described.

The outputs of the six demodulator stages are consecutively connected to six concentric conducting rings $126a$, $126b$, $126c$, $126d$, $126e$, and $126f$, upon a second deck for the audio direction control switch $121$. These conducting rings surround a circular potentiometer $131$ and are consecutively connected in a cyclically repeating order to forty-eight equally spaced points $p_1$, $p_2$, $p_3$, and so forth, around the circular potentiometer. For example, points $p_1$–$p_6$, inclusive, on the potentiometer are connected respectively to rings $126a$–$126f$, inclusive, and then, as to the rings, the connections are repeated with a new set of points $p_7$–$p_{12}$, inclusive, being connected consecutively to rings $126a$–$126f$, inclusive, and so forth. For convenience only a limited number of these connecting points $p$ on the circular potentiometer $131$ are shown, and the spacing between them has been exaggerated.

The circular potentiometer $131$ is adapted to be conductively engaged by a movable tap $132$ extending radially from the shaft $122$ and in fixed relation therewith to rotate with rotation of the shaft $122$. The respective relative angular position between the six ball contacts $123$ and circular potentiometer $131$ and between the ring of segments A and the movable tap $132$, are such that when any given switching segment A fully registers with the arc formed by the six ball contacts $123$, the movable tap $132$ registers with a connecting point $p$ coupled to the conducting ring $126c$. In this or any other position of registry with a connecting point $p$ because of resistive voltage drops along the length of the potentiometer the movable tap $132$ receives significant amounts of signal only from the registering connecting point $p$, the signals from points further removed being substantially completely attenuated. Hence, the circular potentiometer $131$ acts to rearrange any six adjacent signals at the outputs of the six demodulator stages $125$ into consecutive order, as may be demonstrated by the following example.

Assume that the shaft $122$ of the audio direction control switch $121$ has been rotated to bring the movable tap $132$ into registry with connecting point $p_5$ of Fig. 2. In accordance with the arrangement of Fig. 2, segment $A_1$ will correspondingly be brought into engagement with contacts $123c$–$123f$, inclusive, and segment $A_2$ into engagement with contacts $123a$ and $123b$ to cause, as heretofore, described the composite audio signals $s_7$, $s_8$, $s_3$, $s_4$, $s_5$, and $s_6$ to appear respectively at the outputs of demodulators $125a$–$125f$, inclusive, and from thence in the same order upon conducting ring $126a$–$126f$, inclusive. From conducting rings $126c$, $126d$, $126e$, and $126f$, the movable tap $132$ as it is moved clockwise will receive in turn the signals $s_3$, $s_4$, $s_5$, $s_6$ through connecting points $p_3$, $p_4$, $p_5$ and $p_6$, respectively, upon registry with these points. Rather than receiving signals $s_7$ and $s_8$ on rings $126a$ and $126b$ from points $p_1$ and $p_2$, however, resulting in an order of signals as to connecting points of 7, 8, 3, 4, 5, 6, the tap as it is moved further clockwise receives signals $s_7$ and $s_8$ from connecting points $p_7$ and $p_8$ to produce an order of signals as to connecting points of 3, 4, 5, 6, 7, 8. Accordingly, the original order of signals, namely, 7, 8, 3, 4, 5, 6, at the demodulator stage outputs has been rearranged with respect to signals received by the movable tap $132$ to the desired order of 3, 4, 5, 6, 7, 8.

In view of the above description it is apparent that the signals received by the tap $132$, for any given position of the same opposite a connecting point $p$, represented when recorded the response of the master ship sonar to sound received from a real target when in effect trained in a specified direction. The audio direction control switch shaft $122$ is coupled mechanically or otherwise to a part of the training mechanism of the own ship's sonar, for example the soundman's "sonar train" knob $87'$, in such relative angular position that during the playback of a sonic signal program, for any given tap angular position, the train position indicated for the own ship's sonar by the bearing cursor (not shown) of the same, corresponds in reading as to specified direction with the master ship's sonar reading when the program was recorded. With such coupling, as the own ship's soundman changes the indicated train position of his equipment, the own ship's sonar reacts to the program signals in substantially the same manner as would the master sonar if actually so trained with respect to the real target recorded by it. Hence, insofar as the own ship's soundman is concerned, the audio composite signals received by him through his equipment from playback of the program simulate closely the signals which would be generated by his equipment in the presence of a real target. This close simulation exists not only, as is evident, with regard to train position and directivity characteristic but also with regard to range and aural quality as well.

Up to the present, the movable tap $132$ has always been considered in a position opposite a connecting point $p$. Assume, now, however, that the soundman by turning his train knob $87'$ causes the movable tap $132$ to take a position intermediate connecting points $p$ by travel from a position opposite connecting point $p_1$ to a position opposite connecting point $p_2$, for example. It will be noted that in the course of this travel, as to the movable tap 132 the signal from point $p_1$ is gradually decreased from maximum strength to a largely attenuated value while the signal from point $p_2$ is conversely increased from a largely attenuated value to maximum strength.

By virtue of this gradual signal transition as the tap 132 is moved from one connecting point $p$ to another, it is possible for the signals of the sonic signal program to closely simulate the effective directional response patterns of the sonar equipment as a whole to sound waves received from specified directions. These effective equipment response patterns, in contradistinction to the transducer response patterns previously described, are the patterns produced at the sonar equipment lag line assembly outputs as the direction of train for the equipment is swept from one side to the other of specified directions of received sound waves.

For example in Fig. 1, if a continuous sound wave has a line of movement along bisector 52, and there is a sweep in audio train direction between a full coupling position of audio sector segments 72–77, inclusive, with transducer segments 30–35, inclusive, and a full coupling position of the same sector segments with transducer segments 34–39, inclusive, the amplitude of the signal at the output of audio lag line assembly 80 is plotted vertically against a horizontal coordinate of train direction will exhibit, as shown in Fig. 3, first a rise and then a fall reaching a peak when the train direction corresponds with the direction of bisector 52.

The directivity sensitive amplitude characteristic of the mentioned output signal over the sweep thus represents the effective directional response pattern of the master ship sonar equipment for a sound wave received along bisector 52.

In the typical effective response pattern just described and as shown in Fig. 3, it is apparent that the principal plotting points for the pattern may be considered to be furnished by the signals $s_1, s_2, s_3, s_4, s_5$, as each transducer array is in turn fully coupled with the sector segments. In the intervals between these principal points, the pattern makes a substantially regular transition from one point to another for the reason that, as the sector member 71 is turned from one full coupling position to the next, each of the audio sector members 72–77, inclusive, bridges in capacitive coupling relation a fraction of each of two adjacent transducer segments to receive from each an amount of signal proportion to the bridging fraction.

It will be seen therefore that by the use of resistance in the path between each two adjacent connecting points $p$, that the reproducing unit produces for the sonic signal program effective response patterns similar to these of the sonar equipment itself as to principal composite signals, such as $s_1, s_2$, and so forth, in the patterns, and as to the regular transition intervals therebetween. Further, in order to assure exact conformance of the transition intervals of the various program effective responsive patterns with a standard pattern or with those typical of the sonar equipment utilizing the reproducing unit, the resistance per unit length between adjacent connecting points need not be uniform but may be appropriately proportioned, as for example by the use of resistance wire wound about a core to have an appropriately selected length for each turn of wire.

The composite audio signal on the movable tap 132 is brought out from the same by conventional means as for example a collecting ring (not shown) upon the audio direction control switch shaft 122, which ring is conductively engaged by a stationary brush (not shown). From the brush the composite audio signal is fed to the input of a composite audio signal mixer stage 133 where the signal is converted in frequency from its value centering about 800 c.p.s. to the supersonic frequency characteristic of the output signals of the transducers in the own ship's sound head. This conversion in frequency, as later described in more detail, is automatically controlled by the reference frequency signal derived from the playback tape. From the output of the mixer stage 133 the composite audio signal is fed through a set of switching contacts, later described in more detail, so that if both the audio "train-operate" switch and the master "train-operate" switch are thrown to "train" the composite audio signal will be fed directly through the own ship's audio receiver 91' and loudspeaker 92' to be heard by the soundman.

It will thus be seen that the playback unit reproduces, for the audio section of the own ship's sonar equipment a sonic signal program, the signals of which simulate closely insofar as the soundman is concerned the signals which would be produced by the own ship's sonar equipment itself upon detection of a real target by the sound head. Particularly this is true since the recorded signals respond in the same manner, to a change in indicated train effected by the soundman, as do the signals from the sound head itself. Since by preforming, as stated, the forty-eight transducer output signals into forty-eight composite signals $s$ by the recorder unit on the master ship, additionally the recorded sonic signal program is not appreciably effected by tape yaw or tape stretch with the result that the recorded signals heard by the soundman are characterized by the same good aural quality and high directivity characteristic typical of signals originating directly from the sound head.

Considering now the different signals derived by a ninth pickup head $H_9'$ from the ninth track $T_9'$ of the playback tape 119, it will be recalled that the four channels recorded on the track $T_9'$ carry respectively four signals, namely voice commentary, a synchronized sweep wave, a single video composite signal and a reference signal. The multiplex signal formed from these four channels and appearing at the ninth pickup head $H_9'$ is fed in a preamplifier and channel filter unit 140 through four parallel preamplifier sections (not shown) to the input of four channel filter units (not shown) each adapted to pass a different channel and to exclude the others of the channels having the respective carrier wave frequencies $f_a, f_b, f_c$ and $f_d$. From the outputs of the four channel filter units before now separated signal carrying channels are fed respectively through four conventional demodulators 141a, 141b, 141d, and 141e, which eliminate the carrier waves, with the result that only the four mentioned original signals appear respectively at the four demodulator outputs.

It will be recalled, with regard to the reference signal appearing at the output of the demodulator 141e, that this signal had upon recording a frequency value of 800 c.p.s. which value would be exactly reproduced if the signal were played back under conditions identical to those of recording. Concerning the function of this reproduced reference signal, the audio signals of the program upon recording have certain frequency characteristics, the exact reproduction of which is desirable, as for example, the slight change in frequency compared to the usually heard audio frequency caused by Doppler effect. Under normal reproducing conditions, however, it often occurs that the play-back tape moves at a speed different from the master tape speed upon recording because of difference in the power frequency furnished to the respective systems or from other causes. In such case, both the audio signals and the reference signal suffer a frequency shift at the pickups of the playback unit as compared to the original recorded value. The frequency shift of the reference signal, however, may be utilized in a manner described as follows to correct to the recorded frequency values the frequency of the composite audio signals as heard by the soundman.

From the demodulating stage 141e the reference signal is applied to the input of a mixer stage 142. The mixer stage receives as another input the signal of a beat frequency oscillator 143 controllable in frequency in dependence on the voltage value of a direct current control signal fed thereto. In the mixer stage 142 the two separate input signals cooperate to convert the reference signal from a value centering about 800 c.p.s. to a supersonic frequency at the mixer output and representing the difference between the two input frequencies. This supersonic frequency is impressed upon a conventional discriminator 144 producing a direct current signal, changeable in voltage in proportion to the deviation of the input frequency from a standard value. This signal from the discriminator 144 is applied as a control signal to the beat frequency oscillator 143 to adjust its operating frequency in commensurate relation with the control signal voltage. The mixer 142, discriminator 144, and oscillator 143 thus form a closed loop circuit by which in a well-known manner the output of the mixer stage will be maintained at a fixed frequency regardless of the frequency of the input reference signal. It is characteristic of this type circuit that in order to maintain the mixer stage output frequency fixed, as the frequency of the input reference signal increases the frequency of the beat frequency oscillator 143 also increases, and conversely.

The output of the beat frequency oscillator is fed to the input of the composite audio signal mixer 133 to effect a frequency conversion as previously described of composite audio signals centering about 800 c.p.s. and also received as an input to this mixer. If the frequency of an audio signal at the tape 119 is above normal due to change in tape dimension or deviation from standard speed, the beat frequency oscillator input to the mixer 142 will be proportionally above normal and conversely. The supersonic composite audio signals at the output of the composite audio signal mixer 133 represents the difference signal produced by beating together of the two inputs to the mixer. Accordingly, by virtue of the compensating frequency changes of the oscillator signal, the supersonic composite audio signals will be automatically corrected in frequency to those values which they had at the time of recording.

The synchronizing sweep wave is fed from the output of the demodulator 141b to the input of a playback system sweep generator unit 150 essentially similar to the cathode ray tube sweep producing circuits of the sonar equipment itself. This input signal to the playback sweep generator unit 150 effects a synchronization of the operation of the same to cause the two sweep wave outputs thereof to be correlated with the video composite signal of the sonic signal program. The two sweep wave outputs from the playback system sweep generator unit 150 are applied to the horizontal and vertical plates of the own ship's cathode ray tube 50' through a switching connection to be described to produce a helical scan upon the tube screen for visual observation of the target simulated by the sonic signal program.

Of the other two signals derived from the ninth track T₉', namely, the composite video signal and the voice commentary, the voice signal is fed from the output of its demodulator stage 141a through conventional amplifier stages 151 and a loudspeaker 152 to be heard by the soundman, while the composite video signal is fed from the output of its demodulator stage 141d to the intensity modulating electrode (not shown) of the cathode ray tube 50' through a switching arrangement to be now described.

*The switching arrangement*

Considering the switching arrangement, an audio "train-operate" switch 160 has a movable contact 161 adapted to selectively close with a pair of fixed contacts, of which the upper contact 162 is connected to the output of the audio composite mixer stage 133 and the lower contact 163 is connected to the output of audio lag line assembly 80' of the own ship's sonar. The video "train-operate" switch 164 has three movable contacts 165, 168 and 171 associated with three pairs of fixed contacts, each movable contact being selectively adapted to close with either the upper or lower contact of its pair. For the first contact pair, the upper contact 166 is connected to the output of the video composite signal demodulator stage 141d while the lower contact 167 is connected to the output of the video receiver 67'. In both the second and third pair of contacts, the upper contacts 169 and 172 are connected respectively to the two sweep wave outputs of the playback system sweep generator unit 150 while the two lower contacts 170 and 173 are connected respectively to the corresponding sweep wave outputs of the sonar sweep generator unit 48'.

In addition to the audio and video "train-operate" switches described, there is a master "train-operate" switch 175 having four movable contacts 176, 179, 182 and 185 associated respectively with four pairs of fixed contacts, each movable contact thereof being adapted to close selectively with either the upper or lower contact of its pair. In the first pair of contacts, for the master switch the upper contact 177 is connected to the movable contact 161 of the audio "train-operate" switch 160, the lower contact 178 is connected to the output of the sonar audio lag line assembly 80', and the movable contact 176 is connected to the input of the sonar audio receiver 91'. For both the second and third contact pairs of the master switch the upper contacts 180 and 183 are connected respectively to the movable contacts 171 and 168 of the second and third video "train-operate" switch contact pairs, the lower contacts 181 and 184 are connected respectively to the two sweep wave outputs of the sonar sweep generator unit, and the movable contacts 179 and 182 are connected respectively to the horizontal and vertical plates of the sonar cathode ray tube 50'. In the fourth contact pair for the master switch 175 the upper contact 186 is connected to the movable contact 165 of the video "train-operate" switch first contact pair, the lower contact 187 is connected to the output of the video receiver 67', and the movable contact 185 is connected to the intensity modulating electrode (not shown) of the sonar cathode ray tube 50'.

In both the video and master "train-operate" switches the movable contacts respectively therein are adapted to be moved to upper or lower positions simultaneously. The audio, video and master "train-operate" switches may be operated independently of each other but are normally maintained in an "operate" position with their movable contacts down.

From the foregoing description it will be seen that if the master "train-operate" switch 175 is maintained at "operate" position, the signals received by the sonar equipment for observance are all derived from its own sound head. Also, if the master switch 175 is thrown to "train" with its movable contacts upward but both the video switch 164 and the audio switch 160 are maintained in "operate" position with their movable contacts downward, the signals observed by the soundman will continue to be derived from the sound head. In this latter case, however (the master switch being thrown to "train"), if the video switch 164 is thrown to "train" with its movable contacts upward, the paths from the sonar video receiver and the two sonar sweep generator unit sweep wave outputs to the cathode ray tube intensity modulating electrode and two beam control plates, respectively, will be interrupted, while paths from these mentioned cathode ray tube elements to the output of the playback composite video signal demodulator stage 141d and the two sweep wave outputs of the playback system sweep generator 150, respectively, will be completed. Accordingly, the sonar cathode ray tube 50' will be driven in a helical scan by the sonic signal program and will additionally indicate simulated targets derived from the same, while the audio section of the sonar will continue to receive a signal from the sonar sound head to furnish a guard watch for real targets which might be encountered. Conversely, if the master switch 175 is thrown to "train," the video switch 164 is maintained at "operate," and the audio switch 160 is thrown to "train" with its movable contacts upward, the path from the sonar audio lag line assembly 80' to the sonar audio receiver 91' will be opened while the path between the playback audio composite signal mixer stage 133 and the sonar audio receiver 91' will be closed. Accordingly, the audio signal heard by the soundman will be derived from the sonic signal program while the visual presentation on the cathode ray tube will continue to be derived from the sonar sound head to act as a guard watch for real targets which may be encountered. Obviously, if the master switch 175 is thrown to "train" and both the audio and video switches 164 and 160 are also thrown to "train," both the audio and video sections of the own ship's sonar will derive their signals from the sonic signal program reproduced by the playback unit, their being no guard watch in this case.

Operation

The operation of both the recording and reproducing sections of the sonar training system disclosed should at this time be evident but will be described by way of summary. With respect to the recording system, by listening or echo ranging on a real target forty-eight output signals are derived from the forty-eight transducers in the sound head of a master sonar. These forty-eight separate transducer output signals are combined in forty-eight separate lag line assemblies of a recorder unit into forty-eight composite audio signals corresponding to the signals which would be derived from the forty-eight transducer arc arrays of the master ship's sonar. These composite audio signals are separately converted in frequency by mixer stages from supersonic values to values centering about 800 c.p.s. and are then associated in groups to be impressed by modulator stages as modulations upon carrier waves, the carrier waves in each group having spaced apart frequency values cyclically repetitive from one group to the next. Each of these mentioned groups of composite audio signal channels is recorded on a different audio track of a multitrack master tape. On another track of the master tape there is impressed four different channels with spaced apart carrier wave frequencies, the four channels containing respectively a single composite video signal derived from the master sonar, a synchronizing sweep wave derived from the master sonar, a signal of reference frequency derived from an oscillator in the recorder unit and voice commentary, if desired, derived from a microphone and amplifying stages of the recorder unit.

From the master tape the sonic signal program is transferred in a conventional manner to playback tapes which are distributed for training purposes to ships having playback units associated with sonar equipment similar to that of the master ship. As the playback tape is run through the playback unit, the multiplex signals derived from each of the eight audio signal tracks will be fed to a separate switch segment in a ring thereof, any one of which segments may engage one or more of six ball contacts, each of which is connected to a separate demodulator stage through a filter unit tuned to a different one of the carrier wave frequencies in each group of channels. By rotating the switching segment ring, six adjacent composite audio signals may be made to appear, although not necessarily in consecutive order, at the six demodulator stage outputs. These six signals are impressed in cyclically repetitive order upon forty-eight points of a circular potentiometer engaged by a movable tap, where with respect to the signal received by the tap, the six adjacent signals are consecutively arranged. The switching segment ring and the movable tap are so coupled to the training mechanism of the own ship's sonar that by rotating the "sonar train" knob of the same, the composite audio signal on the tap is that signal of the program corresponding in direction to the indicated train position of the own ship's sonar.

From the movable tap the composite audio signal selected by the same is applied to a mixer stage where it is converted in frequency from a value centering about 800 c.p.s. to a supersonic value characteristic of the transducer output signals of the own ship's sonar. This frequency conversion operation is controlled by the reference signal derived from the ninth track of the playback unit so that any frequency deviation of the composite audio signal from change in tape dimension or speed with respect to a standard value is automatically compensated for to produce an output composite audio signal identical to that recorded by the master ship. This composite audio output signal from the mentioned mixer stage is applied through a switch arrangement to be heard by the sound man through the audio receiver and loudspeaker of the own ship's sonar.

The composite video signal derived from the ninth track of the playback tape is applied through a switching arrangement to the own ship's sonar cathode ray tube. The synchronizing sweep wave, also derived from this ninth track, is used to synchronize the operation of a playback unit sweep generator which produces two sweep waves to be applied to the horizontal and vertical plates of the cathode ray tube to produce a helical scan correlated with the video composite signal of the sonic signal program. The voice commentary which may also be recorded on this ninth track is reproduced through amplifier stages and a loudspeaker incorporated into the playback unit.

The invention thus produces a sonar training system consisting of a section for recording, as a sonic signal program, the exercises of a master ship with a real target, and a section for reproducing this sonic signal program through the sonar of another ship in which, during the various operations involved in the training system, no distortion of the aural quantity and directivity characteristic of the audio signal will arise. The playback section of the training system also provides means for modifying signals received from the program to conform with the directional characteristic of the own ship's sound head, provides smooth signal transition from one train position to another analogous to the transition of signals received from the own ship's sound head itself, and provides for any frequency correction of the audio signals which may be necessary due to change in tape dimension or speed from a standard value.

The illustrative embodiment described above and shown in the accompanying drawings is obviously susceptible of modification in form and detail within the spirit of the invention. For example, instead of using arc arrays of six adjacent transducers with consequent combination in the recorder section of only six adjacent transducer output signals, it is more common in practice to use arc arrays of eighteen transducers, which practice poses the necessity for combining each eighteen adjacent transducer output signals in the recorder section to form by a lag line assembly a single composite audio signal. The modification required of the illustrative embodiment to accomplish this eighteen fold combination is obvious from the foregoing disclosure. Also it is apparent that each track on the multitrack master playback tape may carry a number of channels different from the maximum of six channels disclosed and that hence the number of tape tracks required for a sonic signal program may be varied. It is further apparent that instead of the switching arrangement disclosed for connecting the playback section to the own ship's sonar, a system of patch cables may be utilized in which cables carrying normal operation signals to the inputs of the own ship's sonar audio and video presentation sections may be unplugged, and separate cables carrying similar signals from the sonic signal program of the play-back unit may be plugged in as substitutes therefor.

There are, in addition, further modifications within the spirit of the invention which should be noted. For example, the arrangement by which the separate output signals of a plurality of elements in an array are combined in the recorder unit into a composite signal similar to that produced by the equipment when normally operating from the array, is an arrangement applicable not only to sound wave detection equipment but to other types of wave detection equipment as well, as for example electromagnetic wave detectors. Further it is obvious that the various composite signals of the recorder unit may be assigned to different multiplexed channels by other types of modulation than that of amplitude modulating carrier waves with spaced apart frequency values. For example, time division pulse multiplexing might be used. Further it is apparent that the same magnetic tape may be used for recording with a master ship sonar equipment and for playback with a different sonar equipment. By using in a well-known manner the nine heads associated with the nine tracks on the magnetic tape to perform the functions both of recording and reproducing, a single sonar equipment may be adapted for use with both a recording and a reproducing unit so that a given sonic signal program can be first recorded and then later reproduced through the same equipment.

Other modifications will suggest themselves to persons skilled in the art. The invention, therefore, is not to be limited save as defined in the appended claim.

I claim:

A device for deriving a smoothly continuous signal corresponding to the resultants of groups of independent signals which constitute consecutive members of a progression of such independent signals, said device deriving said continuous signal from a multiplex input signal consisting of an ordered series of similar sets of frequency-differentiated, ordered groups of said independent signals, and said device comprising, in combination: first means arranging said series of sets of signals in proper order and separating said frequency-differentiated, ordered groups of signals from said properly ordered series of sets, said first means including a rotary switch comprising a plurality of switching segments circularly arranged and a plurality of contact elements physically spaced to cover a distance substantially equal to the rotative dimension of one of said switching segments, and including a plurality of frequency filters, each connected to a different one of said rotary switch contact elements; second means arranging said separated groups of signals in proper order, said second means comprising a plurality of conducting elements, each connected to a different one of said frequency filters; and third means combining said properly ordered groups of signals into a smoothly continuous series of resultant signals and deriving from said smoothly continuous series of resultant signals a signal corresponding to any specific point in said series, said third means comprising potentiometer means having a circular impedance element and a rotatable contact arm, said arm mechanically coupled for rotation in synchronism with said rotary switch, and said impedance element being tapped at equally spaced intervals with consecutive tap points being connected in order to a different one of said plurality of conducting elements in a cyclically repetitive series.

References Cited in the file of this patent
UNITED STATES PATENTS

| | | |
|---|---|---|
| 1,356,488 | Compare | Oct. 19, 1920 |
| 1,910,977 | Weiss | May 23, 1933 |
| 2,206,538 | Rhodes | July 2, 1940 |
| 2,369,662 | Deloraine et al. | Feb. 20, 1945 |
| 2,632,057 | Koenig | Mar. 17, 1953 |
| 2,739,298 | Lovell | Mar. 20, 1956 |
| 2,764,754 | Garfield | Sept. 25, 1956 |